Feb. 2, 1965

E. J. CRIPPEN, JR 3,167,887

DRILL POINTING MACHINE

Filed Feb. 2, 1962

INVENTOR
ELVERTON J. CRIPPEN
DECEASED
EVELYN CRIPPEN
ADMINISTRATRIX

BY

Gravely, Lieder & Woodruff

ATTORNEYS

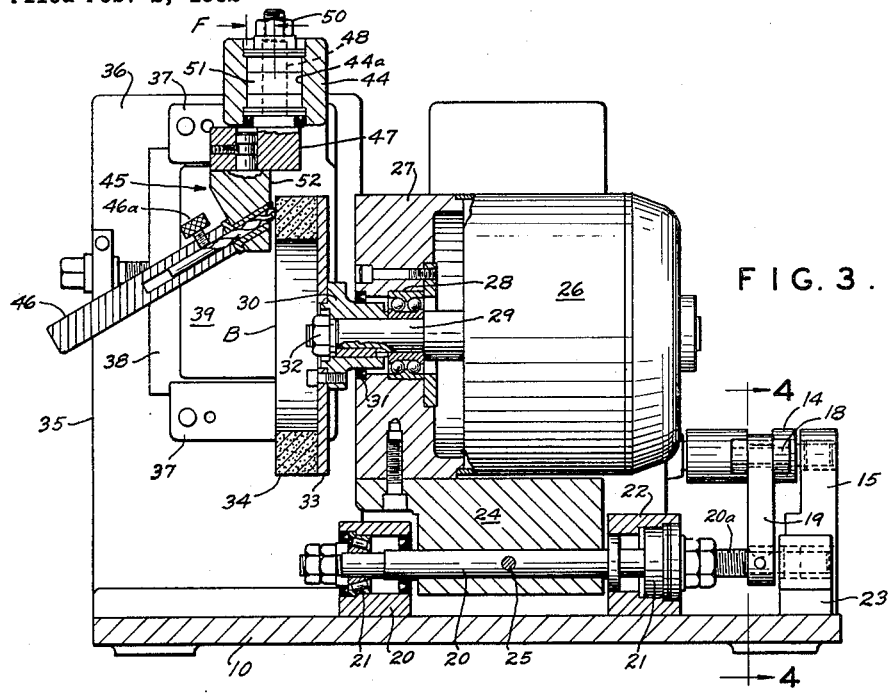

Feb. 2, 1965

E. J. CRIPPEN, JR 3,167,887

DRILL POINTING MACHINE

Filed Feb. 2, 1962

INVENTOR
ELVERTON J. CRIPPEN
DECEASED
EVELYN CRIPPEN
ADMINISTRATRIX
BY
*Gravely, Lieder & Woodruff*
ATTORNEYS Feb. 2, 1965 E. J. CRIPPEN, JR 3,167,887
DRILL POINTING MACHINE
Filed Feb. 2, 1962 5 Sheets-Sheet 5

INVENTOR
ELVERTON J. CRIPPEN
DECEASED
EVELYN CRIPPEN
BY ADMINISTRATRIX

*Gravely, Lieder & Woodruff*

ATTORNEYS 3,167,887
DRILL POINTING MACHINE
Elverton J. Crippen, Jr., deceased, late of St. Louis County, Mo., by Evelyn Crippen, administratrix, 7508 Cromwell Drive, St. Louis County, Mo.
Filed Feb. 2, 1962, Ser. No. 170,844
15 Claims. (Cl. 51—55)

This invention relates to improvements in machines for grinding new points on broken drills or for repointing and sharpening drills.

The machine of this invention shall be described in connection with its use to repoint, sharpen or form a new point on a common type of fluted drill, but no unnecessary limitation is intended thereby.

The general type of twist or fluted drill is shaped at its end to provide suitable cutting edges on a cone and the flutes open into the cone to provide a space for cuttings to get out of the cutting area and access for directing cutting lubricant to the working edges. Perhaps the most difficulty encountered with twist drills is obtaining proper point geometry. The point is the business end of the drill and unless it is accurately formed the drill is likely to be broken or its useful life reduced. A properly shaped end has all cutting edges of the same length and cone or angular inclination, and the same lip relief angle is provided for the edges. The importance of these features is known, but there is a great need for a simple grinding machine which can produce precise results in the hands of non-technical operators who can follow a series of simple procedures which will result in precision drill grinding. Accordingly, it is a most important object of this invention to provide a machine capable of precision grinding drills to overcome the problems attendant upon failures in the past to properly secure drill point geometry.

It is an important object of this invention to provide a novel machine for treating drills which may be dull or broken to restore the points thereof or to prolong the useful life thereof at low cost.

It is also an object of this invention to provide drill point grinding machines of novel and simple construction which are capable of accurate and rapid operation by relatively non-technical or unskilled operators.

It is a further object of this invention to construct a drill pointing machine in a new and unique manner to render the pointing operation as simple as possible without detracting from its capabilities to produce accurate results on broken or dulled drills, as well as to produce accurate points on new drills.

It is another object of this invention to provide a drill pointing machine that will grind a drill point of accurate form, and with correct geometry of point angle, chisel angle and lip relief angle, all of which may be achieved by simple manipulation of the drill.

It is still another object of this invention to construct drill pointing machines capable of handling drills of a wide range of sizes in a uniform series of operations so that complicated jigs, and the like may be avoided or eliminated entirely with consequent economy of operation.

It is still a further object of this invention to provide drill pointer machines with a simple and compact arrangement of parts and components for actuating a grinding wheel and for locating and manipulating the drill in relation to the grinding wheel such that accurate results can be achieved quickly and economically.

A preferred embodiment of the invention chosen for disclosure herein comprises a grinding wheel and drive therefor mounted for oscillating movement adjacent a movable drill holder, means to establish and maintain the oscillating movement of the grinding wheel, and means for mounting and controlling the movement of the drill holder such that a simple manipulative act on the drill itself will result in establishing the desired geometry to be formed on the drill point. These and other parts, components and sub-combinations of parts and components constitute characteristics of the invention and will be described in greater detail in connection with the machine disclosed in the accompanying drawings, wherein:

FIG. 3 is a side view partly in sectional elevation of the machine;

FIG. 4 is a fragmentary sectional elevational view taken on line 4—4 in FIG. 3;

FIG. 5 is a fragmentary front view of the drill holder device incorporated in the present machine;

FIG. 6 is a sectional view taken at line 6—6 in FIG. 5;

Figure 1:
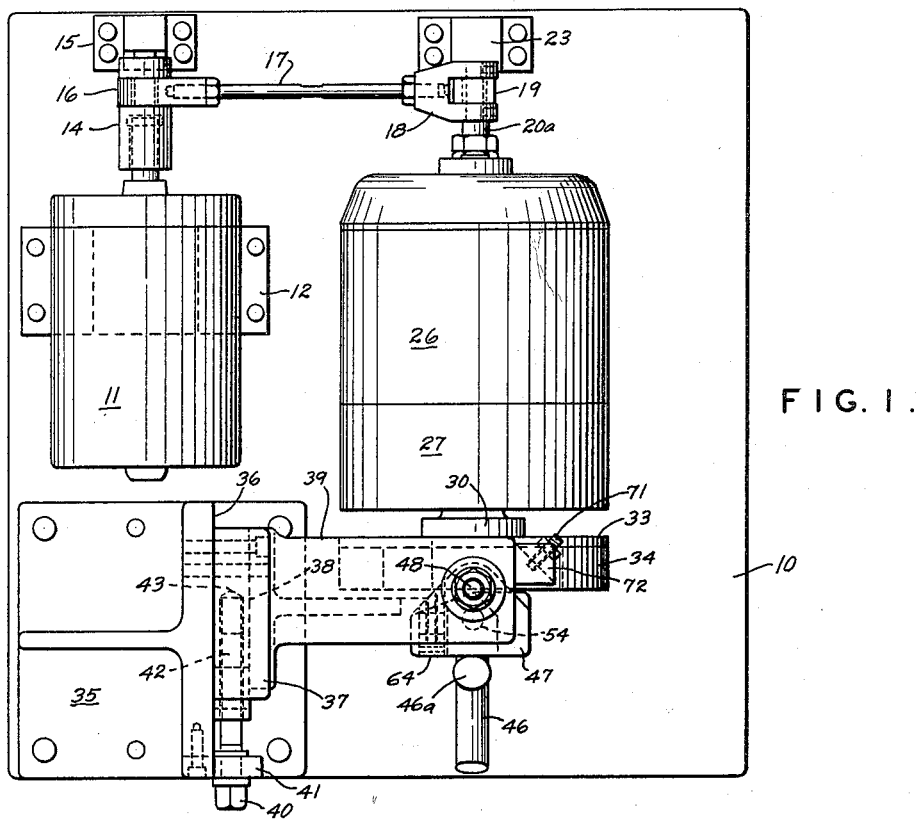
FIG. 1 is a top plan view of the machine forming the preferred embodiment of the invention.

The features and components of the preferred drill pointing machine will first be described in connection with the views of FIGS. 1 to 4 inclusive. The organization of parts is made on a suitable base 10 which may be a portable support or a part of a work stand, table or the like. The base 10 carries a gear head type drive motor 11 (FIG. 1) attached by a vibration damping type mounting frame 12, and the motor has a geared-down drive shaft 13 connected to an eccentric drive element 14 mounted for rotation in a suitable bearing stand 15 on the base 10. The element 14 has its eccentric shaft 14a (FIGS. 1 and 4) connected to one end 16 of a pitman rod 17, the opposite end of such rod being provided with a clevis element 18 pivotally connected to an oscillatable crank 19. The crank 19 (FIGS. 3 and 4) is suitably keyed to a shaft 20 at its outer end portion 20a, the shaft 20 being carried in spaced anti-friction bearings 21 suitably mounted in housings 22 on the base 10 while the end portion 20a of this shaft is steadied in a bearing block 23 on base 10. The motor 11 has its built-in gear box designed to drive the shaft 14 at about one revolution per minute so that a very slow reciprocating motion will result.

The shaft 20 carries a bracket member 24 (FIGS. 2 and 3) which is fixed thereto by a suitable pin 25 so that movement of shaft 20 will result in movement of the bracket 24 in an oscillating cycle determined by the geared head connected to the eccentric drive element 14. Bracket member 24 carries a drive motor 26 which is connected thereto through a bearing head 27. The head 27 encloses a suitable bearing 28 for the motor shaft 29, and the bearing cavity is closed at its outer end by an adapter element 30 in conjunction with a seal 31. The adapter is removably attached to the motor shaft 29 by nut 32, and a mounting plate 33 is removably connected to the enlarged outer end of the adapter 30 such that its outer face may mount a grinding wheel 34 of annular or ring form.

The base 10 also carries a fixed stand 35 (FIGS. 1, 2 and 3) at one side of the grinding wheel 34, and the stand is formed with a face 36 on which are mounted upper and lower gibs 37 to provide a horizontally directed slide-way for the base 38 of an adjustable bracket member 39. The bracket member 39 is attached to the base 38, though it may be integrally formed therewith if desired, and moves with the base 38 in the slide-way formed by the gibs 37. Movement of the bracket member 39 is obtained by a suitable adjusting screw 40 which is rotatably fixed in a thrust plate 41 attached to the edge of stand 35. The threaded end 42 of screw 40 engages a threaded bore 43 in the base 38 to provide the necessary drive for moving the base 38 upon rotation of screw 40. Bracket member 39 extends toward the grinding wheel 34 and is formed with an upper head 44 having a bore 44a therein (FIG. 3) which is centered on a vertical line through the grinding wheel shaft 29 and lower shaft 20 (FIG. 2).

Before describing other parts and components it can be appreciated that motor 11 operates the pitman rod 17 in a slow back and forth cycle through the eccentric element 14 and this actuates the crank 19 in like manner. In consequence of this drive the shaft 20 is rocked in its bearings 21 and the motor 26 driving the grinding wheel 34 is also rocked through an arc with its center in the axis of shaft 20. It is a preference that the rocking motion of the motor 26 and grinding wheel 34 traverse an arc of about 8° to each side of a vertical center line, such arc being indicated by the included angle A shown in FIG. 2 which angle will be of the order of 16°. Thus, the grinding wheel 34 is caused to oscillate or rock past the head 44. As previously described the head 44 may be adjusted in a horizontal direction relative to gibs 37 by screw 40 so that the axis or center line of the bore 44a in such head may be brought into accurate alignment with the face plane B of the grinding wheel 34, as indicated in FIG. 3.

Figure 2:
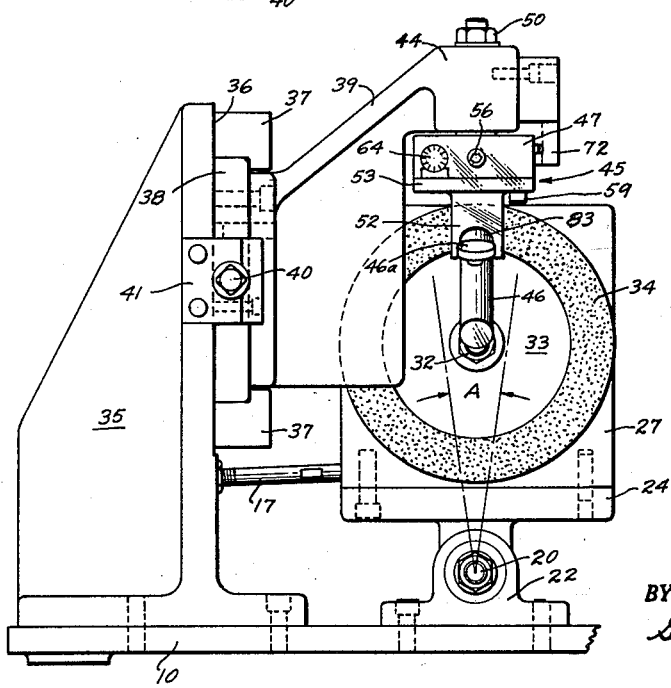
FIG. 2 is a front elevational view of the improved machine.
Figure 7:
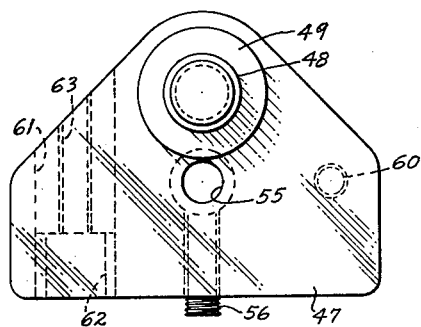
FIG. 7 is a top plan view of a component of the holder of FIG. 5.
Figure 10:
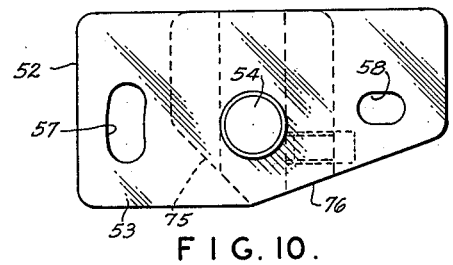
FIG. 10 is a top plan view of another component of the holder of FIG. 5, the view being rotated 180° from its normal position relative to the component shown in FIG. 5.
Figure 8:
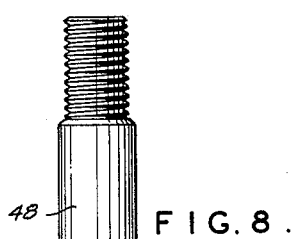
FIG. 8 is a front elevational view of the component of FIG. 7.
Figure 13:
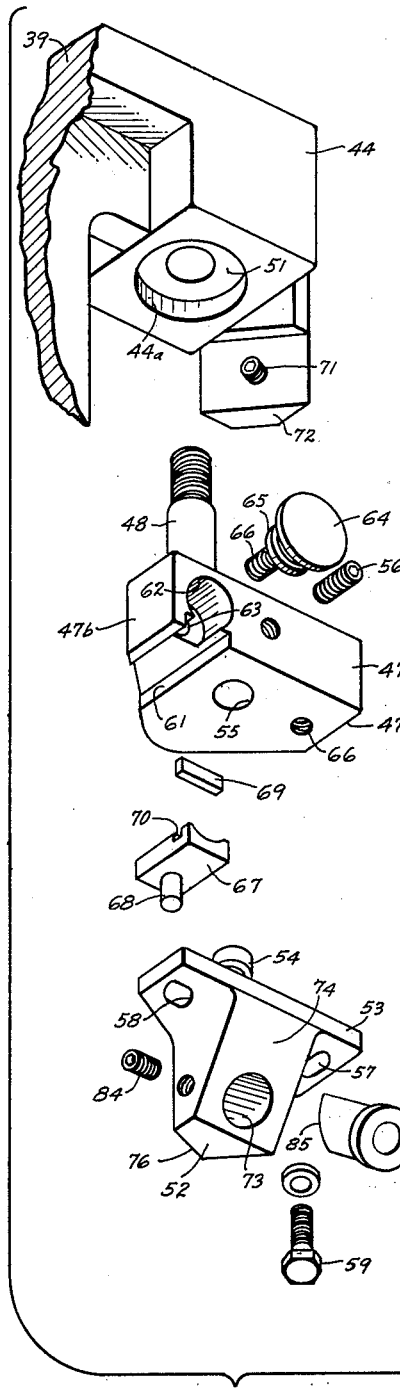
FIG. 13 is an exploded perspective view of the components of the drill holder and guide sub-combination and also including a fragmentary portion of the supporting means therefor.

FIGS. 1, 2 and 3 illustrate a preferred drill tool 46 for manipulating the drill D while in the device 45. The details of the device 45 will now be described in connection with FIGS. 5 to 13, inclusive. As shown in FIGS. 5 and 6, the device 45 comprises a head 47 formed with a shaft 48 projecting from a boss 49, the outer end of the shaft being threaded to receive an attaching nut 50 (FIG. 3) for securing the shaft 48 in a suitable bearing 51 in the head bore 44a with the boss 49 seated in the lower portion of such bore. The head supports a guide 52 having a mounting plate 53 which abuts the under surface of the head 47. Guide 52 is provided with a notched pivot shaft 54 which fits into a suitable bore 55 in the head 47. The bore 55 (FIG. 7) is off-set relative to the shaft 48 on the head for a purpose to appear later. The shaft 54 is secured in bore 55 by means of a set screw 56 which engages in the notch thereof without restricting its rotation. The mounting plate 53 of guide 52 is also formed with an arcuate slot 57 at one side of pivot shaft 54, the shaft center line being the center of the arc for such slot 57. A second slot 58 is formed in the guide mounting plate 53 on the opposite side of pivot shaft 54 from arcuate slot 57, and the slot 58 is elongated in a direction substantially perpendicular to the slot 57 (see FIG. 10). The guide plate 53 is secured to the head 47 by a machine screw 59 which passes through the slot 57 and engages in a tapped hole 60 (FIG. 13). The screw 59 acts to clamp the guide 52 to the head 47 in any of its positions of adjustment within the limits of the arcuate slot 57.

As may be seen in FIGS. 7, 8, 9 and 13, the head 47 is formed with a slide channel 61 at one side of the center line or axis of shaft 48, such channel being enlarged at one end by a tangentially communicating counter-bored recess 62 having a tapped hole 63 in its inner wall. The recess 62 is adapted to receive an adjusting knob 64 such that a grooved boss 65 thereon works freely in such recess with a portion of its body projecting into the channel 61. The inner end of the knob has a threaded stem 66 engaged in the tapped hole 63 so that rotation of the knob will move the knob with its grooved boss axially in or out relative to the recess 62 and in the direction of the axis of the channel 61. Before assembly of the guide 52 on the bottom face of the head 47, a cross head slide 67 is placed on the guide 52 with its drive pin 68 seated in the slot 58. A key element 69 is placed in a suitable slot 70 in the slide 67 and the key also engages in the slotted boss 65 of the knob. When assembled (FIG. 6) properly and held by the screw 59 the parts 67, 68 and 69 will form a drive connection between the head 47 and guide 52 such that turning of knob 64 will rotate the guide 52 relative to the head 47 about the axis of the pivot shaft 54. The plate 53 on the guide 52 closes the bottom side of the channel 61 and retains the cross-head slide 67 and key element 69 in position.

Figure 14:
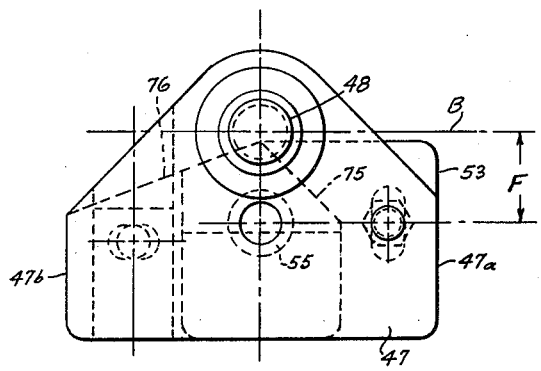
FIG. 14 is a top plan view of the components of FIGS. 7 and 10 in assembled relation.
Figure 15:
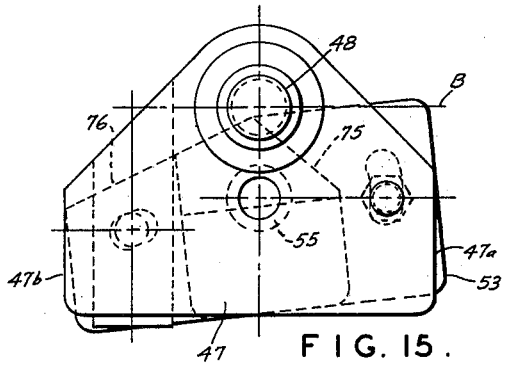
FIG. 15 is a view similar to FIG. 14 but showing one condition of adjustment.
Figure 16:
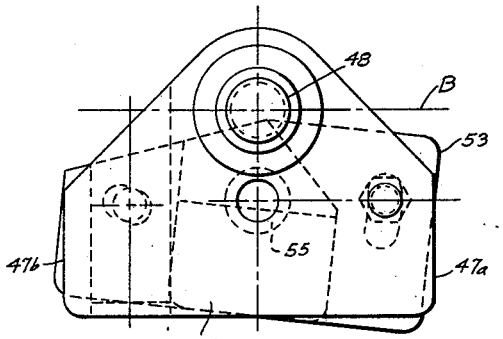
FIG. 16 is another view similar to FIG. 14 but showing another condition of adjustment.

The assembled head 47 and guide 52 are placed in the head 44 of the stand 39 in such a position that the flat side portion 47a of head 47 will abut an adjustable stop screw 71 (FIG. 13) carried in a depending arm 72 on the bracket head 44 to thereby limit the extent of pivoting movement in a direction to that side of the bracket head. Pivoting movement in an opposite direction will be governed by engagement of the flat side portion 47b of head 47 upon a portion 39a of the stand 39 (FIG. 13). In order to angularly adjust the guide 52 on the head 47 it is necessary to loosen screw 59 and turn knob 64 in or out on its threaded stem 66. The resulting adjustment can be fixed by tightening up on screw 59. Since there is angular movement of the guide 52, the arcuate slot 57 is formed with its center in the pivot shaft 54, but slot 58 must be at right angles to avoid binding on the pin 68 of the cross-head slide 67 which moved in a straight line in the channel 61. The relative motions of the head 47 and guide 52 are shown to advantage in FIGS. 14, 15 and 16. FIG. 14 is the centered position of guide 52, FIG. 15 is the angular position to the right of center, and FIG. 16 is the leftward position. It is apparent from these views that the guide 52 is caused to assume an angularly adjusted position by turning of knob 64.

Figure 11:
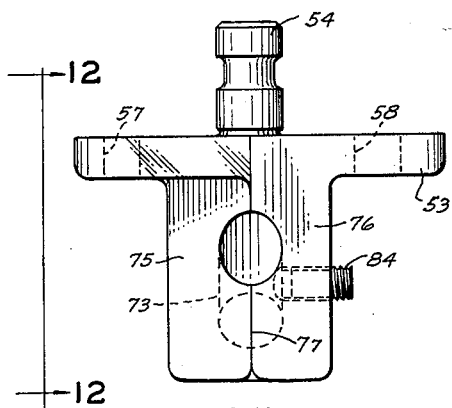
FIG. 11 is a rear elevational view of the component shown in FIG. 10.
Figure 9:
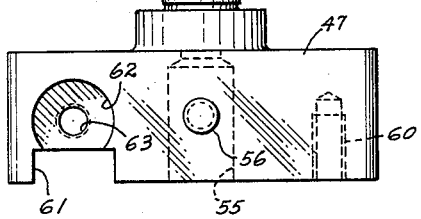
FIG. 9 is a bottom view of the component shown in FIGS. 7 and 8.
Figure 12:
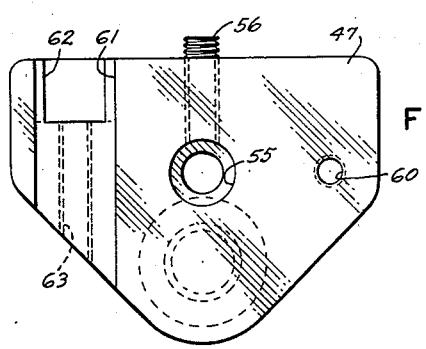
FIG. 12 is a side view of the component of FIG. 10.

As may be seen in FIGS. 5, 6 and 13, the guide 52 is formed with an oblique bore 73 which is 30° to 35° off a true vertical axis, depending upon the drill being ground. The rear surface of the guide is vertical and is formed with two angularly related faces 75 and 76 which meet in an apex line 77 substantially coinciding with the center line of the oblique bore 73 (FIG. 11). The faces 75 and 76 provide clearance for the guide 52 in relation to the face plane B of the grinding wheel 34 such that the guide 52 can be positioned directly in front of the face plane B and still swing angularly about the center line of the pivot shaft 48 fixed in the bracket head 44. The purpose for the pivoting of the head 47 and the relative angular adjustment of guide 52 on the head 47 will appear presently.

Figure 17:
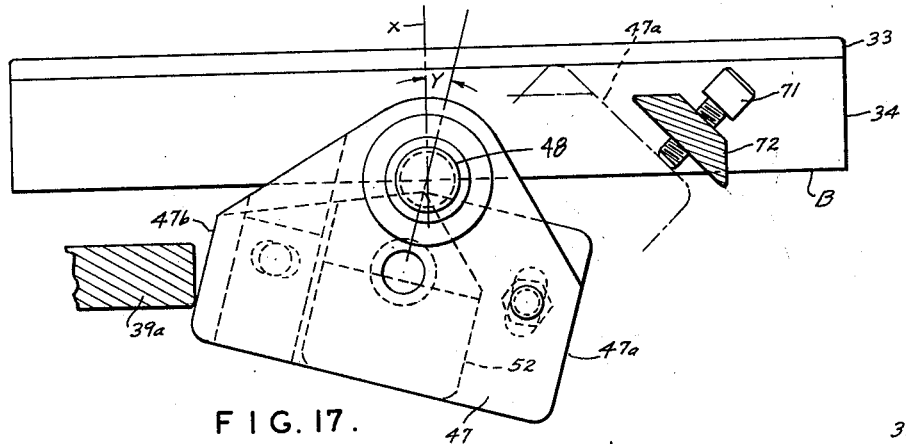
FIG. 17 is a fragmentary and diagrammatic view of the drill holder and guide components in relation to the grinding wheel.
Figure 18:
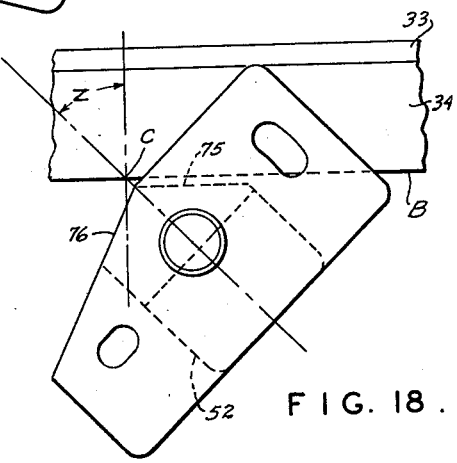
FIG. 18 is a further view like FIG. 17, but illustrating the components in a different relation.

As may be seen in FIGS. 17 and 18, the vertical axis of the pivot shaft 48 for the head 47 is located at point C in the face plane B of the grinding wheel 34. Comparing this relation with FIG. 3 it will appear that the head 47 is arranged to occupy a position above the grinding wheel 34 on the vertical line through the shaft 20 and shaft 29 (see FIG. 2) when the grinding wheel shaft 29 is in its vertically centered position between its extremes of side-to-side oscillation. As a consequence the guide 52 is located directly in front of the grinding wheel and at its upper face so that the upwardly inclined oblique bore 73 is open to and has its longitudinal axis directed substantially at the face plane B of the grinding wheel 34 and between the outer and inner peripheral margins. Again referring to FIG. 17 it will appear that the angular swing of the head 47 leftwardly to bring its side face 47b against the stop 39a will cause the guide 52 to move to a position at about 15° to the left of the perpendicular axis X. This angular swing is represented by the angle Y. In FIG. 18 the rightward swing of the head to a position in which the side face 47a is against stop pin 71 will locate the guide 52 at a position of about 45° to the right of the axis X. This angular swing is represented by the angle Z. The angular adjustment of the guide 52 relative to the head 47 as seen in FIGS. 15 and 16 is, of course, superposed on the head swing angles. From the foregoing disclosure in FIGS. 17 and 18 it will appear that the point C denotes the apex of the angle of swing from 15° left to 45° right, and such angle is, of course, less than 90°.

Figure 19:
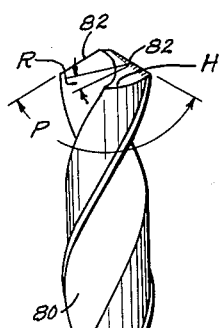
FIG. 19 is an elevational view of a drill to illustrate the geometry of the point which this apparatus forms.
Figure 20:
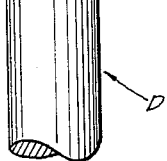
FIG. 20 is an end view of the drill cutting end.

Looking now at FIGS. 19 and 20 where a typical drill D has been shown, it will be understood that the body of the drill is formed with flutes 80 which spiral upwardly from the shank 81 and open at the conical point having the included lip cone angle P. The cutting elements or lips 82 on the point are in this example two in number and each has a chisel angle M and a lip relief angle R. The lip relief angle R is desirably generated so that there is no up-swing at the heel H of the ground relief or clearance surface to interfere with the cutting action of the drill. All of these characteristics of the drill cutting lip, chisel and lip relief angles are obtained by the present machine by positioning the drill D in the oblique bore 73 and, assuming adjustments have been made, swinging it in the guide through the included angles Y and Z while pressing the drill upwardly in the bore 73 against the grinding wheel 34. To aid in this operation a suitable bushing 83 (FIG. 6) is located in the bore 73 and is removably secured by a set screw 84 (FIGS. 11 and 13). The bushing 83 has its inner end formed with an oblique face 85 to conform with the angularly meeting faces 75 and 76 on the guide 52. Bushing 83 also carries a stop element of any suitable shape, such as a pin 86 at its inner end, the stop pin axis initially being positioned in a vertically upright altitude as shown in FIG. 6. In the example shown the pin 86 has its axis centered on the axis of the bore in bushing 83. The pin 86 may assume angular positions by turning the bushing in bore 73 as desired before tightening the set screw 84. The through bore 83a of bushing 83 is sized to snugly receive the drill D to be pointed, and several sizes of bushings are usually provided to accommodate a range of drill sizes. A selection of guides 52 may also be provided with varying diameters of oblique bores 73 and varying oblique bore angles K (FIG. 6) of from approximately 30° to 35° depending on the geometry of the drill point cone and chisel angles. Selection of bore diameter and oblique angle of the bore 73 are, of course, understood and appreciated in order to cover the full range of drills to be ground. With this in mind, it has been found that one machine can handle drills from a No. 65 (.0350) to one-half inch diameter, as well as millimeter drills varying from .9 mm. to 12.5 mm.

In the preferred machine the grinding wheel 34 is a commercially standard 6½ inch diameter wheel mounted on a backing plate 33 for ready attachment. As is shown in FIG. 3 the grinding is performed on the outer circular face (plane B) to obtian substantially constant surface speed, and the wheel 34 is oscillated in the manner disclosed so that the grinding of the drill point is not confined to the same spot on the circular face, but moves along a chord of the circular face to produce an even wear on the grinding wheel. The oscillation produces a superior point surface finish and less time loss in dressing the face plane B, as well as longer life of the wheel since a larger area is used.

In operating the machine, the initial steps are to select the desired bushing 83 for the drill diameter and install the bushing with the stop pin 86 in its vertical position. The drill D to be ground is then clamped in the socket of the holder 46 and is set at the proper length by the socket set screw 46a (FIG. 3). The drill is inserted in the bushing 83 and pushed upwardly until the stop element 86 engages in one of the flutes 80. With the motor 26 driving the grinding wheel 34 and motor 11 causing the grinding wheel 34 and its motor 26 to oscillate through the included angle of about 16° (8° to each side of a vertical axis) the drill is pushed against the grinding face and is swung in the guide 52 from a position of 15° at the left (FIG. 17) to the rightward position of 45° at the right (FIG. 18). This swinging motion is performed at a steady or uniform speed and may be performed several times as desired. This operation grinds one face of the drill point. Then the drill and holder are pulled out to clear the stop element 86 and rotated 180° before being pushed inwardly to locate the second drill face. The swinging motion of 15° to the left and 45° to the right is carried out as previously described. These operations are performed on each drill and the grinding is continued for each face until the end of the holder 46 abuts the enlarged end of the bushing 83 to stop the drill from being pushed further inwardly. The amount of drill body material to be removed is thereby determined and stopped by the holder 46 abutting the bushing 83.

Important features of the present machine are embodied in the head 47, the guide 52 and the bushing stop element 86, all of which are compactly and simply arranged in a novel and cooperative manner. For example, the drill point chisel angle M is determined by the position of the stop element 86. As viewed in FIG. 2, rotating the bushing 83 counterclockwise from a position with the stop element 86 in its vertical position will decrease the chisel angle M. Rotation in the opposite direction will therefore increase the chisel angle. Once this setting of the stop element has been made the set screw 84 may be tightened to hold the bushing 83 and drills may be ground with this chisel angle setting without further adjustment of the bushing 83.

The drill point lip relief angle R is obtained by adjusting the guide 52 relative to the head 47 as in FIGS. 15 or 16, or in intermediate positions such as the setting shown in FIG. 14. The desired adjustment is determined by the angular indicia inscribed on the face of the knob 64 (FIG. 5). Adjustment of the knob will produce positive settings in lip relief clearance within a range of from 1° to 20°. The setting selected will repeat for each of a series of drills and may be changed at will. A characteristic of the relief angle is the extent of drop-off at the heel H (FIG. 19) and for a given drop-off distance F (FIG. 14) is important, as this radius will govern the rate of movement of the heel surface into the grinding wheel 34 as the angular swing (FIG. 18) of the guide is performed.

In adjusting the machine to generate a desired drill point included angle P it is only necessary to select the proper guide 52, that is a guide with the proper oblique angle for the bore 73 which receives the bushing 83. A guide 52 with a 30° bore angle K will automatically generate an included angle P on the drill point of 120°, and no adjustment is needed. The precise equality in length of the lips 82 on the drill is obtained by the holder 46 being pushed into the bushing 83 for each face grinding operation on the same drill. The sliding adjustment of base 38 for the stand 39 permits the support to be set with the axis in head 44 at or on the plane B of the grinding wheel as wear on such face occurs.

Figure 21:
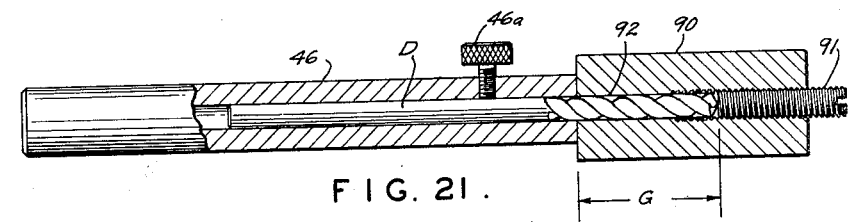
FIG. 21 is a view, partly in section, of an accessory device for gaging drill length to produce uniform results in mass drill grinding operations.

In FIG. 21 there is shown an accessory tool 90 having a set screw 91 in one end of a gaging socket 92. The tool 90 is used in conjunction with the drill holder 46, heretofore described. Since the precise length from the outer face of the drill bushing 83 (FIG. 6) to the front or face surface of the grinding wheel is known by adjusting the bracket member 39 relative to the face plane B of the grinding wheel 34, it is desirable to determine the minimum amount of material needed to be ground off to furnish the proper point on a drill. This minimum length of material plus the length in the bushing 83 to the grinding wheel face is set in the socket 92 by adjusting the screw 91 to produce the socket depth G. Thereafter each drill D is inserted cutting or broken end first into the socket 92 against the screw 91. The holder 46 is adjusted over the drill shank and against the tool 90 and the screw 46a is set to hold the drill so it can be withdrawn from tool 90 and inserted in the bushing 83 for grinding.

The foregoing disclosure has been given in connection with a preferred embodiment of drill pointing machine, but such disclosure is not intended to impose limitations on the scope of the invention. For example, in the foregoing description reference has been made to vertical and horizontal directions of motion or attitudes of certain parts and components. These terms are relative only and should be interpreted in that light as the device 45 may be located at some other place about the periphery of the grinding wheel 34, and the adjustment of stand 39 would be altered accordingly. It is also contemplated that the machine could be positioned with the shafts 20 and 29 in vertical or inclined positions. Also, the distance F (FIG. 14) could be varied to produce a different drop-off at the heel H of the drill, it being noted that the dimension F is important to the heel characteristic on the drill point. Furthermore, the adjustments for selecting desired chisel angle M or cone angle P or lip relief angle R can be made independently so as not to produce any changes in the other angles. It is appreciated that after the principles of this invention are understood from the foregoing disclosure changes and alterations will come to mind, but it is contemplated that all these changes or alterations shall be included in the claims appended hereto.

What is claimed is:

1. In a drill pointing machine the combination of a rotating grinding member having a flat grinding surface, support means adjacent said grinding member and having a pivot head thereon with the axis of the pivot head normally coincident with the plane of said flat grinding surface and intercepting the axis of rotation of said grinding member, and a drill positioning device mounted in said pivot head and having a portion projecting adjacent said flat grinding surface, said projecting portion having a drill guiding bore therein open to said flat grinding surface at a substantially constant oblique angle relative to said flat grinding surface, said device being pivotally movable about the pivot head axis and moving said projecting portion, and stop means for said device positioned on said support means to be engaged by said device, said stop means being located in spaced relation such that said drill guiding bore axis may be swung through an included angle relative to the flat grinding surface which is greater to one side than the other of a position perpendicular to said flat grinding surface, and the apex of said last mentioned angle of swing being coincident with the axis of said pivot head.

2. In the drill pointing machine set forth in claim 1, a bushing element mounted in said drill guiding bore, and a stop pin carried by said bushing element adjacent the end thereof which is open to said flat grinding surface, said bushing element being adjustable in said bore to adjust said stop pin therewith.

3. In the drill pointing machine set forth in claim 1, means carrying said support means for movement relative to said grinding member such that said axis of the pivot head is maintained coincident with the plane of said flat grinding surface.

4. In the drilling pointing machine set forth in claim 1, said stop means on said support means being spaced apart a distance to limit the swing of said device to an included angle of less than ninety degrees, one of said swing limiting stop means being adjustable.

5. In the drill pointing machine set forth in claim 1, said projecting portion on said drill positioning device being movable relative to other portions of said device, and means operably connected to said device and projecting portion to effect movement therebetween in opposite directions.

6. In the drill pointing machine set forth in claim 1 said projecting portion on said drill positioning device being pivotally movable relative to other portions of said device, the axis of said movement being different from the axis of said pivot head, and means operably connected to said device and projecting portion to effect pivoting movement therebetween in opposite directions.

7. In a machine for grinding the point of a fluted drill which point is characterized by having a chisel angle, a cutting lip relief angle and a lip cone angle: the improvement which includes a grinding member having a flat grinding surface; means to operate said grinding member; a support stand having a head spaced from said grinding member; and a drill positioning and guiding device pivotally mounted in said head for angular swinging movement relative to said flat grinding surface, the pivot axis for said device being substantially coincident with the grinding surface, said device comprising a first member movable about said pivot axis in opposite directions, a second member carried by said first member for selective pivotal adjustment thereon about an axis different from said pivot axis and spaced from the flat grinding surface, said second member having a drill guiding bore therein opening to said grinding surface at an oblique angle, the axis of said drill guiding bore moving with said first member in its angular swinging movement and sweeping through an angle whose apex is substantially coincident with the flat grinding surface, and a drill receiving bushing rotatably mounted in said guiding bore with one end open to said grinding surface and having a stop element at said open end, said stop element on said bushing engaging in the drill flutes to fix the position of the drill cutting lips relative to said flat grinding surface, the selective adjustment of said second member relative to said first member determining the cutting lip relief angle, the rotation of said bushing changing the position of said stop element which determines the chisel angle and said bore oblique angle determining the cone angle.

8. In the machine set forth in claim 7, the improvement further including means carrying said support stand for movement toward and away from a plane containing said flat grinding surface such that the pivot axis for the device pivotally mounted in said support stand head is maintained coincident with the plane of such grinding surface.

9. In the machine set forth in claim 7, the improvement further including means to limit the said angular swinging movement of said first member to an included angle of less than ninety degrees.

10. In the machine set forth in claim 7, the improvement further including means operably connected to said grinding member to swing the latter member in a direction substantially parallel with the plane of the flat grinding surface.

11. In the machine set forth in claim 7, the improvement further including means operably mounting said grinding member for rotation about an axis perpendicular to said flat grinding surface, and drive means connected to said operable means and effective to cause swinging movement thereof in reverse directions at a substantially uniform rate of movement.

12. In the machine set forth in claim 7, the improvement further including a drill holding member having a bore for receiving a drill shank with the end to be ground extending therefrom, and a drill securing element on said holding member, said latter member having an end adapted to abut said bushing to thereby limit the extent of drill penetration in said bushing.

13. A positioning and guiding device for use with a grinding wheel adapted to grind the point of a fluted drill, said device comprising a head member having a mounting shaft about which said head member swings, a drill guiding member mounted in said head member for pivotal movement relative to said head member, adjustment means operably connected between said members to cause relative pivotal movement therebetween, the axes of movement for said members being off-set, said guiding member having a drill receiving bore whose axis is oblique to the axis of pivotal movement of said guiding member, and a drill flute engaging stop pin carried adjacent one end of said drill receiving bore, said stop pin being angularly adjustable such that the axis thereof may be selectively adjusted into and out of a position parallel with the axis of said head member shaft, the swinging movement of said head member sweeping said guiding member in an arcuate path with center substantially constantly coincident with the axis of said mounting shaft.

14. In a drill point grinding machine, the improvement of a grinding wheel having a flat face perpendicular to the axis of rotation of the wheel, a drill positioning device having two relatively displaceable bodies, said device being mounted adjacent said wheel for bodily pivoting movement about a single axis coincident with the flat face of said grinding wheel, one of said bodies being constructed to include said single pivot axis for bodily pivoting movement, and the other of said bodies being mounted on said one body for said relative movement about an axis which is off-set from said pivot axis, means operably engaging said two bodies to adjust the relative displacement of said bodies about the off-set axis, said grinding wheel and drill positioning device having at least one position in which said single pivot axis and said off-set axis intersect said axis of rotation of said grinding wheel, and means cooperating with said other body to position a drill with its point directed toward said flat face at an angle which is substantially constant in the bodily pivoting movement of said device about said single axis.

15. In the drill point grinding machine set forth in claim 14, said means operably engaging said two bodies to adjust the relative displacement thereof includes a manually movable element having a connection with said two bodies to reversibly adjust the same about said off-set axis, and said element is provided with indicia to visually indicate the amount of adjustment.

References Cited by the Examiner

UNITED STATES PATENTS

| | | | |
|---|---|---|---|
| 2,238,064 | 4/41 | Kraus | 51—288 |
| 2,785,510 | 3/57 | Garrison | 51—219 X |
| 2,795,085 | 6/57 | Rosenblom | 51—33 |
| 2,889,669 | 6/59 | Babbitt | 51—288 |
| 2,911,771 | 11/59 | Amiet | 51—219 |
| 2,915,858 | 12/59 | Webster et al. | 51—219 |
| 2,922,258 | 1/60 | Bass et al. | 51—55 |
| 3,056,237 | 10/62 | Comiskey | 51—33 |
| 3,057,122 | 10/62 | Hewes et al. | 51—219 X |

FOREIGN PATENTS

| | | |
|---|---|---|
| 778,733 | 1/35 | France. |
| 985,472 | 3/51 | France. |
| 1,206,734 | 8/59 | France. |

LESTER M. SWINGLE, *Primary Examiner.*

FRANK H. BRONAUGH, JOHN C. CHRISTIE,
*Examiners.*